(12) United States Patent
Tsukamoto (10) Patent No.: US 7,656,063 B2
(45) Date of Patent: Feb. 2, 2010

(54) PUMP MOTOR

(75) Inventor: Naoyuki Tsukamoto, Kosai (JP)

(73) Assignee: ASMO Co., Ltd., Shizuoka-Ken (JP)

( * ) Notice: Subject to any disclaimer, the term of this patent is extended or adjusted under 35 U.S.C. 154(b) by 514 days.

(21) Appl. No.: 11/331,574

(22) Filed: Jan. 13, 2006

(65) Prior Publication Data
US 2006/0290230 A1 Dec. 28, 2006

(30) Foreign Application Priority Data

Jan. 14, 2005 (JP) ............................. 2005-007755
Mar. 8, 2005 (JP) ............................. 2005-063981

(51) Int. Cl.
*H02K 5/16* (2006.01)
(52) U.S. Cl. .................... 310/51; 310/90; 310/216.016; 310/216.053; 310/154.45; 417/273; 417/415; 303/116.4
(58) Field of Classification Search .................. 310/90, 310/156.36, 51, 216.016, 216.053, 154.45; 417/273, 415; 303/116.4, 116.1, DIG. 10
See application file for complete search history.

(56) References Cited

U.S. PATENT DOCUMENTS 5,434,463 A * 7/1995 Horski ....................... 310/248
5,635,778 A * 6/1997 Fujita et al. .................... 310/51
6,078,118 A * 6/2000 Reinartz et al. ................ 310/89
7,332,843 B2 * 2/2008 Tsukamoto ................... 310/90
2003/0035716 A1 * 2/2003 Tanaka ........................ 415/110
2006/0290230 A1 * 12/2006 Tsukamoto ................. 310/216

FOREIGN PATENT DOCUMENTS

JP 10-248225 9/1998

OTHER PUBLICATIONS

*Journal of Nippondenso Technical Disclosure*, Reference No. 106-033 (Jan. 15, 1996).

* cited by examiner

*Primary Examiner*—Quyen Leung
*Assistant Examiner*—David W. Scheuermann
(74) *Attorney, Agent, or Firm*—Patterson, Thuente, Skaar & Christensen, P.A.

(57) ABSTRACT

A rotor is accommodated in a yoke housing. Six magnets are arranged at equal intervals in the circumferential direction on the inner circumferential surface of the yoke housing so as to face the rotor. The core is generally cylindrical and includes an annular portion at an anti-output side and a balance at an output side. The magnets have six poles so as to effectively narrow a basal path width of the core in which the line of magnetic force concentrates most and magnetic saturation is likely to occur most. This reduces the diameter of the core. Therefore, the motor is effectively miniaturized in the axial direction and in the radial direction without complicating the formation steps.

16 Claims, 8 Drawing Sheets

PUMP MOTOR

BACKGROUND OF THE INVENTION

The present invention relates to a pump motor.

Demands for safety and functionality of an automobile have become diversified and various mechanisms have thus been developed.

However, the space for installing a mechanism in an automobile is limited since space is enclosed in an automobile. Thus, each mechanism must be miniaturized to increase the number of mechanisms installed on the vehicle body. It is also required that motors functioning as actuators for the mechanisms also be miniaturized.

For instance, a motor for use in an anti-lock brake system includes an output shaft, which functions as a rotation shaft. The motor rotation shaft drives a piston pump that moves in a radial direction of the motor. It is required that the output shaft be shortened so that it does not project out of a pump housing in the axial direction of the motor.

Japanese Laid-Open Patent Publication No. 10-248225 describes a DC motor that shortens the output shaft. A commutator is arranged at the radially inner side of a core of an armature. Further, a brush is biased in the axial direction. This shortens the output shaft for a length corresponding to the dimension of the commutator.

Normally, the maneuverability and the rotation balance of the motor become unsatisfactory as the rotor diameter increases. This hinders immediate hydraulic pressurization of the pump driven by the motor and causes noise when the motor produces rotation. Thus, a motor with a small rotor diameter is preferred.

However, miniaturization of the rotor in the radial direction is difficult with the DC motor described in the above publication since the commutator is arranged in the radially inner side of the armature.

Further, since the brush is biased in the axial direction of the output shaft, a mechanism for biasing the brush towards the commutator must be arranged adjacent to the armature in the axial direction. Thus, it is difficult to shorten the motor as a whole in the axial direction.

SUMMARY OF THE INVENTION

The present invention provides a motor miniaturized in the axial direction and the radial direction.

One aspect of the present invention is a motor for use with a pump. The motor includes an output shaft, and the pump includes a pump plunger reciprocated in a radial direction of the output shaft by rotation of the output shaft. The motor has a core fixed to the output shaft so as to be integrally rotatable with the output shaft. The core includes an annular portion and a plurality of teeth extending radially outward from the annular portion. A plurality of windings are wound around the plurality of teeth. A commutator is fixed to the output shaft so as to be integrally rotatable with the output shaft. The commutator is formed to be generally cylindrical, and the commutator has a circumferential surface having an electrical contact point. A bearing rotatably supports the output shaft. At least one of the bearing and the commutator overlap the windings in an axial direction of the output shaft. A magnetic field body has six magnetic poles.

Another aspect of the present invention is a motor including an output shaft for driving a driven device. The driven device includes a housing member. The motor has a core fixed to the output shaft so as to be integrally rotatable with the output shaft. The core includes an annular portion and a plurality of teeth extending radially outward from the annular portion. A plurality of windings are wound around the plurality of teeth. A commutator is fixed to the output shaft so as to be integrally rotatable with the output shaft. The commutator is generally cylindrical, and the commutator has a circumferential surface with an electrical contact point. A first bearing and a second bearing rotatably support the output shaft. The first bearing and the second bearing have the core and the commutator arranged therebetween in the axial direction of the output shaft. At least one of the second bearing and the commutator overlap the windings in the axial direction of the output shaft. A magnetic field body has six magnetic poles. A case accommodates the output shaft. The case includes a through hole for insertion of the first bearing. The through hole has a dimension smaller than the dimension of the first bearing in the axial direction of the output shaft. A biasing portion biases the output shaft so that part of the first bearing extends through the through hole and out of the case. The part of the first bearing extending out of the case is pushed against the pump housing and is fitted to and held by the pump housing when the case is attached to the driven device.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A first embodiment of the present invention will now be described with reference to FIGS. 1 to 10.

Figure 1A:
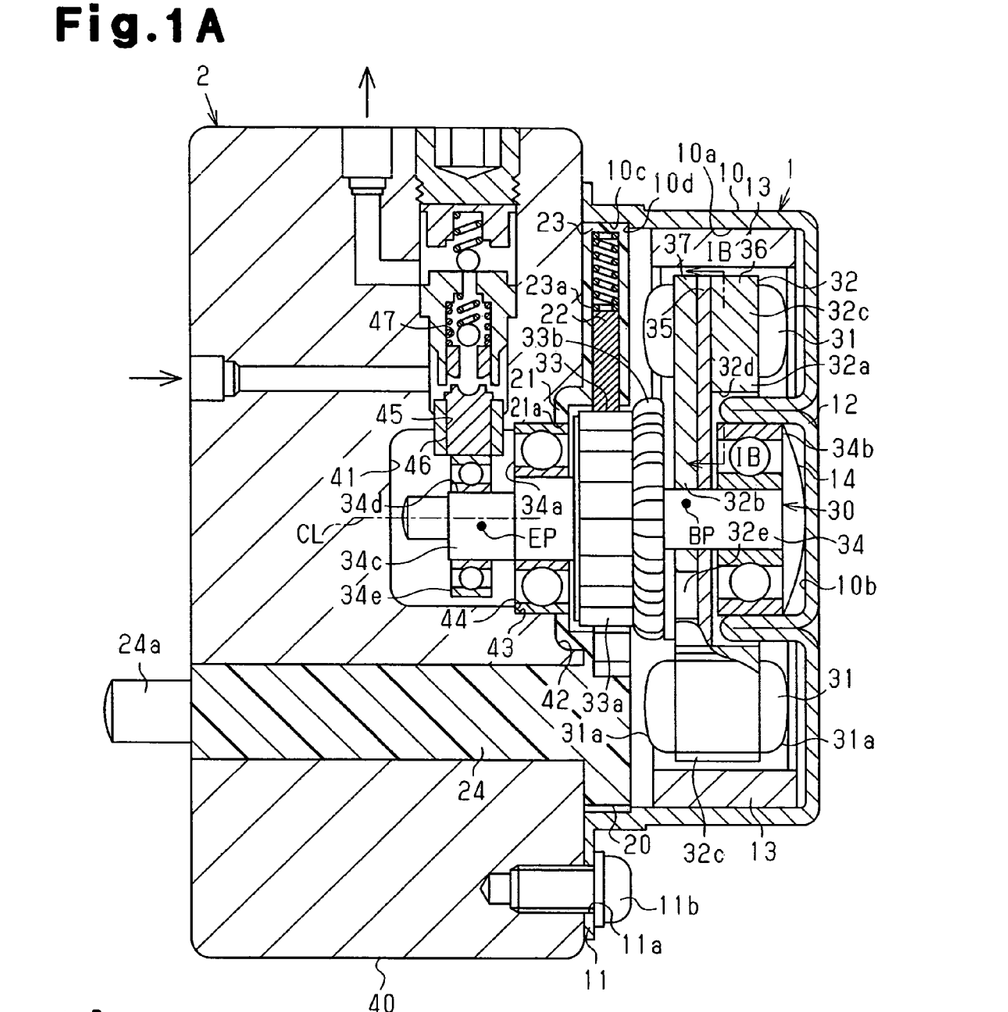
FIG. 1A is a cross-sectional view of a pump device incorporating a pump motor according to a first embodiment of the present invention.

As shown in FIG. 1A, the pump device includes a motor section 1, which functions as a drive source, and a pump section 2, which supplies pressurized hydraulic oil. To simplify description, as viewed in FIGS. 1A and 2, in the motor section 1, the direction towards the left, that is, towards the pump section 2 is referred to as the output side and the direction towards the right is referred to as the anti-output side. When the motor section 1 is activated and driven, the hydraulic oil in the pump section 2 is pressurized and discharged from the pump device to each mechanism of the automobile, such as an anti-lock brake system.

The motor section 1 will first be described.

Figure 2:
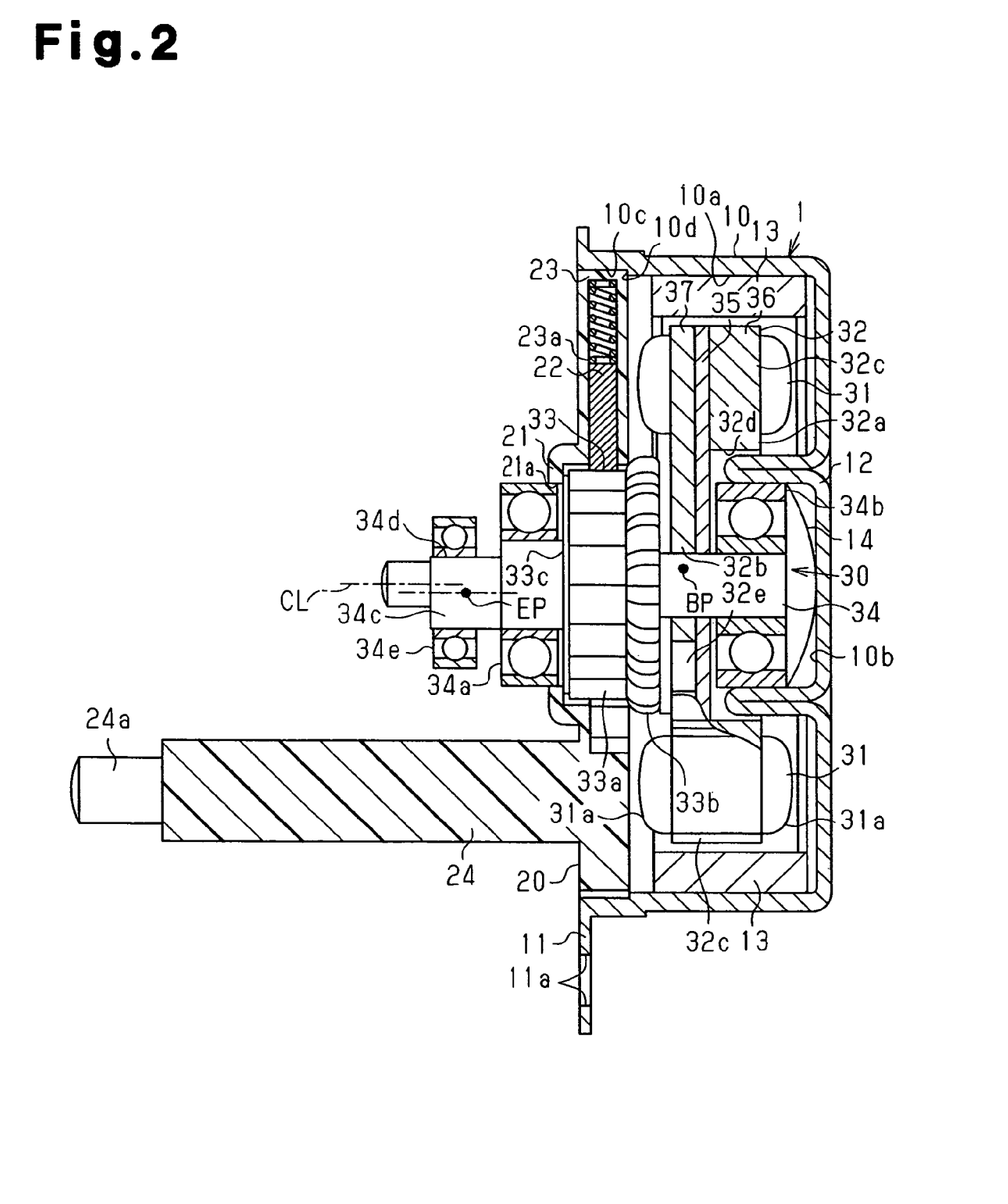
FIG. 2 is a cross-sectional view of the pump motor of FIG. 1 taken before attachment to a pump housing.

As shown in FIG. 2, the motor section 1 includes a yoke housing 10, which is cylindrical and has a closed bottom, a resin end plate 20 for closing the opening of the yoke housing 10, and a rotor 30 accommodated in the yoke housing 10 and extending through the end plate 20. The opening of the yoke housing 10 is located at the output side of the rotor 30, that is, the side of the pump section 2, and the rotor 30 extends through the central part of the end plate 20. The yoke housing 10 and the end plate 20 form a case for accommodating the rotor 30. The motor section 1 of the present embodiment is a DC motor for rotating the rotor 30 with DC power.

Figure 3:
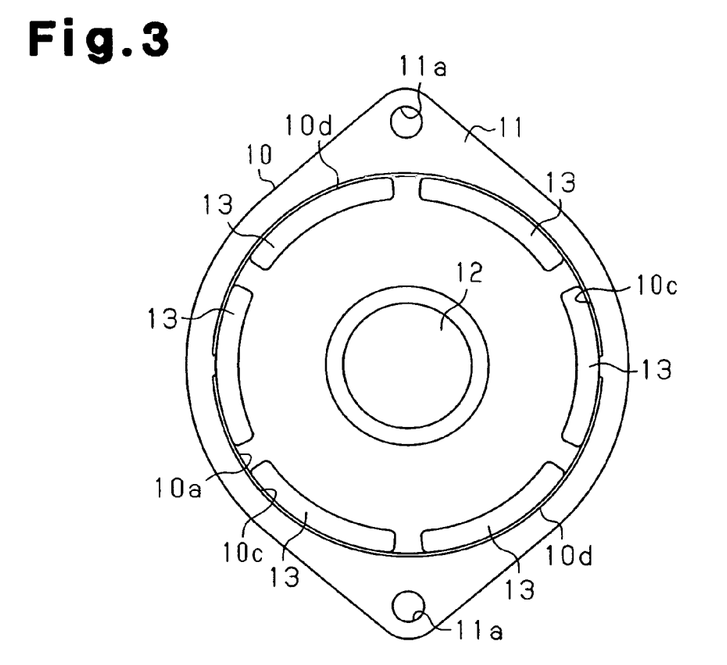
FIG. 3 is a front view showing a yoke housing and six magnets of the pump motor of FIG. 1.

The yoke housing 10 includes a flange 11, which is formed to extend radially outward from the opening, and a bearing seat 12, which accommodates one end of the rotor 30. As shown in FIG. 3, six magnets 13 are arranged on the inner circumferential surface 10a of the yoke housing 10 at equal intervals in the circumferential direction so as to face the rotor 30. Thus, a magnetic field body attached to the yoke housing 10 includes six magnets 13 in the first embodiment. Bolt holes 11a are formed in the flange 11, and the motor section 1 and the pump section 2 are fixed to each other by bolts 11b inserted into the bolt holes 11a. The bearing seat 12, which is generally cylindrical and has a double layer structure, projects toward the opening, that is, toward the output side from the bottom 10b of the yoke housing 10 and is folded back at the projected end. A belleville spring 14 is accommodated in the bearing seat 12, and the rotor 30 is biased towards the output side by the belleville spring 14. An end plate receptacle 10c to which the end plate 20 is fitted is formed at the opening of the yoke housing 10. The end plate receptacle 10c is formed outward in the radial direction from the inner circumferential surface 10a of the yoke housing 10 where the magnets 13 are arranged. A stepped portion 10d is formed between the end plate receptacle 10c and the inner circumferential surface 10a, and the stepped portion 10d restricts movement of the end plate 20 towards the anti-output side.

The end plate 20 includes a holding portion 21 for holding the rotor 30 and a brush holder 23 for holding a brush 22 that supplies power to the rotor 30.

The holding portion 21 is formed to project outward from the generally central part of the end plate 20 and a through hole 21a having an inner circumferential surface that surrounds the rotor 30 is formed at the central part of the holding portion 21.

The brush holder 23 is arranged on the surface of the end plate 20 at the anti-output side. The brush 22 is biased towards the rotor 30 in the radial direction of the rotor 30 by a spring 23a accommodated in the brush holder 23.

An end plate holding portion 24 is integrally formed at the end plate 20 below the through hole 21a as viewed in FIG. 2. The end plate holding portion 24 projects towards the output side. A plate 24a also used as a wiring, which is electrically connected to the brush 22, is embedded in the end plate holding portion 24. The end plate 20 is fixed to the pump section 2 in a state in which the end plate holding portion 24 fixed to the pump housing 40.

The end plate 20 is made of resin, and the end plate 20, the brush holder 23, the holding portion 21, and the end plate holding portion 24 are formed integrally.

As shown in FIG. 1A, the surface on the output side of the flange 11 of the yoke housing 10 is generally flush with the surface on the output side of the end plate 20. This ensures that the end plate 20 and the yoke housing 10 both contact the pump section 2 in a fixed state.

As shown in FIG. 2, the rotor 30 includes a core 32 around which a winding 31 is wound, a commutator 33 arranged on the output side of the core 32, and an output shaft 34 to which the core 32 and the commutator 33 are fixed in an integrally rotatable manner. The output shaft 34 extends through the generally central parts of the core 32 and the commutator 33.

Figure 4:
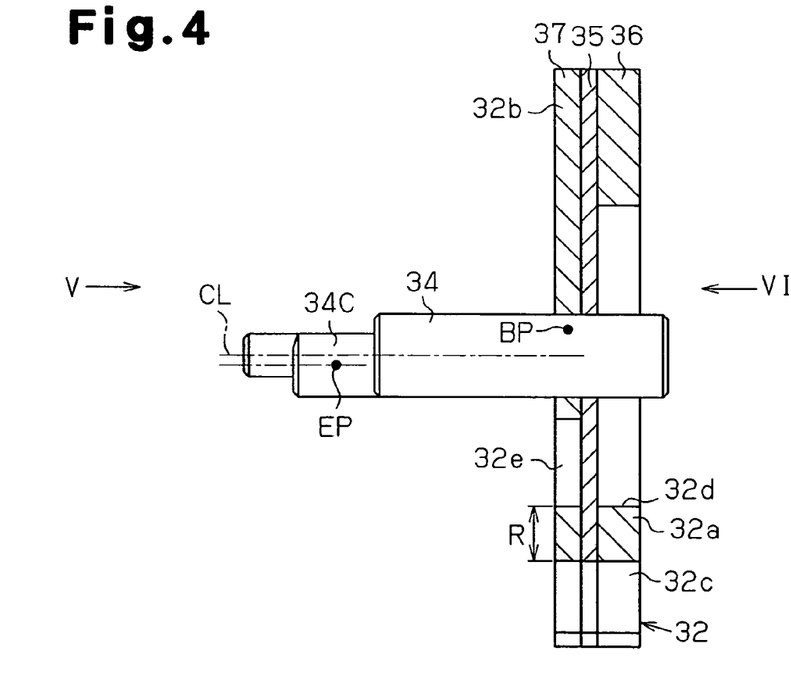
FIG. 4 is a cross-sectional view of a core and an output shaft shown in FIG. 1.
Figure 5:
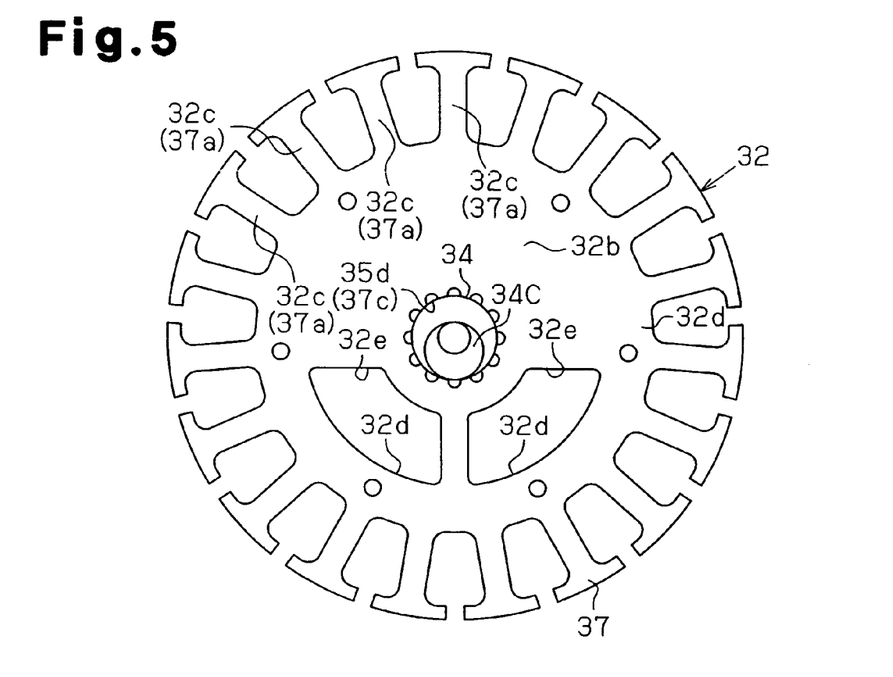
FIG. 5 is a view taken in the direction of arrow V in FIG. 4.

As shown in FIG. 4, the core 32 has the shape of a generally circular disk and includes a core basal path 32a, which is defined by an annular portion on the anti-output side, and a balance 32b on the output side. As shown in FIGS. 1A and 2, a plurality of teeth 32c extending radially outward are formed on the outer periphery of the core 32. The winding 31 is wound around the plurality of teeth 32c. The core 32 is formed by stacking three types of first to third core pieces 35 to 37, each in pluralities, in the axial direction of the output shaft 34, that is, in the direction the rotation axis CL of the output shaft 34 extends.

Figure 1B:
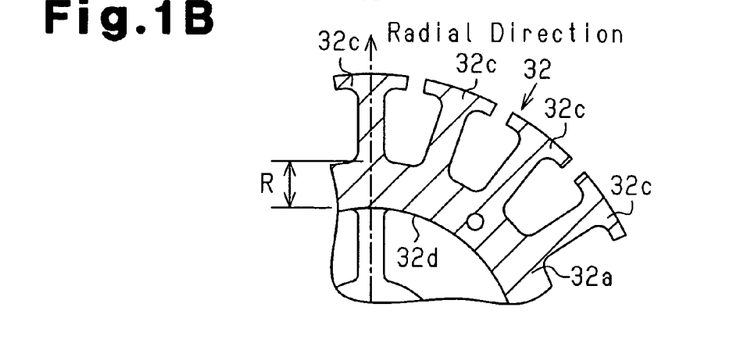
FIG. 1B is a partial cross-sectional view taken along line 1B-1B in FIG. 1A.
Figure 6:
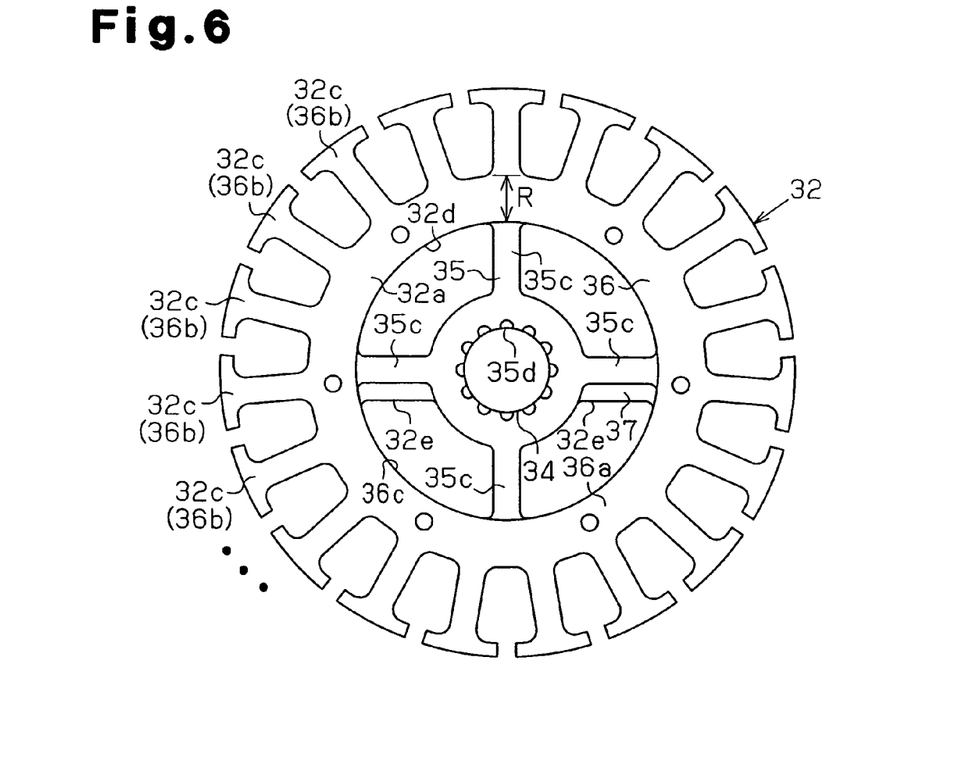
FIG. 6 is a view taken in the direction of arrow VI in FIG. 4.

As shown in FIGS. 1B and 6, the core basal path 32a has an inner circumferential surface 32d. The core basal path 32a is defined by forming a generally cylindrical recess in the central portion of the end face on the anti-output side of the core 32. The width in the radial direction of the core basal path 32a is referred to as the basal path width R.

As shown in FIG. 4 and FIG. 6, the balance 32b includes a recess 32e formed in the output side of the end face of the core 32. The center of gravity BP of the balance 32b is located at a position separated from the rotation axis CL of the output shaft 34 in a cross-section that is generally orthogonal to the output shaft 34.

As shown in FIG. 2, the commutator 33 is generally cylindrical, and a plurality of commutator pieces 33a slidably contacting the brush 22 are arranged at equal intervals in the circumferential direction on the outer circumferential surface of the commutator 33. The brush 22 is arranged at the surface on the anti-output side of the end plate 20. That is, the electrical contact between the rotor 30 and the brush 22 is located on the outer circumferential surface of the rotor 30, and the rotor 30 is supplied with power from the brush 22 through the commutator 33 to be rotated.

The commutator 33 includes a hook 33b projecting radially outward. The hook 33b is electrically connected to the winding 31 of the core 32 at the end on the anti-output side of the commutator 33 close to the core 32. The end on the outer side in the radial direction of the hook 33b defines a maximum outer diameter portion of the commutator 33.

As shown in FIG. 1A and FIG. 2, the output shaft 34 is supported in a manner rotatable with respect to the end plate 20 by a first bearing 34a, which functions as an output side bearing. The output shaft 34 is supported in a manner rotatable with respect to the yoke housing 10 by a second bearing 34b, which functions as an anti-output side bearing. The first bearing 34a and the second bearing 34b are arranged with the core 32 and the commutator 33 located in between. The first bearing 34a is arranged on the output side from the commutator 33 and accommodated in the through hole 21a of the end plate 20. The second bearing 34b is arranged on the anti-output side from the core 32 and accommodated in the bearing seat 12 of the yoke housing 10.

The diameter of the through hole 21a of the end plate 20 is smaller than the diameter of the commutator 33 and greater than the outer diameter of the first bearing 34a. The dimension of the holding portion 21 of the end plate 20 is smaller than the dimension of the first bearing 34a in the axial direction of the output shaft 34. In other words, the thickness of the holding portion 21 is less than the height of the first bearing 34a. As shown in FIG. 2, since the rotor 30 is biased towards the output side by the belleville spring 14 accommodated in the bearing seat 12 in a state in which the motor section 1 is detached from the pump housing 40, the end face on the output side 33c of the commutator 33 contacts the holding portion 21 and the first bearing 34a projects towards the output side from the holding portion 21. The second bearing 34b and the bearing seat 12 for supporting the second bearing 34b in the radial direction are arranged on the inner side in the radial direction with respect to the inner circumferential surface 32d of the core basal path 32a. That is, the core 32 and the second bearing 34b overlap in the axial direction of the output shaft 34.

As shown in FIG. 1A, an eccentric portion 34c is formed at the end on the output side of the output shaft 34. The eccentric portion 34c has a cross-section set so that the rotation axis CL and the center of gravity EP are separate. A third bearing 34e is fixed to the outer circumferential surface 34d of the eccentric portion 34c. The third bearing 34e contacts a plunger 46 of the pump section 2. The eccentric portion 34c is accommodated in a transmission chamber 41 formed in the pump housing 40.

As shown in FIG. 4, the recess 32e of the balance 32b and the center of gravity EP of the eccentric portion 34c are arranged on the same side (lower side in FIG. 4) with respect to the rotation axis CL of the output shaft 34. The center of gravity BP of the balance 32b and the center of gravity EP of the eccentric portion 34c are each arranged on one side of the rotation axis CL of the output shaft 34. That is, as viewed in FIG. 4, the center of gravity BP of the balance 32b is located above the rotation axis CL of the output shaft 34, and the center of gravity EP of the eccentric portion 34c is located below the rotation axis CL of the output shaft 34.

The first to the third core pieces 35 to 37 forming the core 32 will now be described in detail.

As shown in FIG. 4, the core 32 is formed by the three types of the first to third core pieces 35 to 37, more specifically, the first core piece 35 forming the generally central portion in the axial direction of the core 32, the second core piece 36 forming the portion at the anti-output side of the core 32, and the third core piece 37 forming the portion at the output side of the core 32. The first to the third core pieces 35 to 37 are formed by pressing, for example, a plate shaped metal material.

Figure 7:
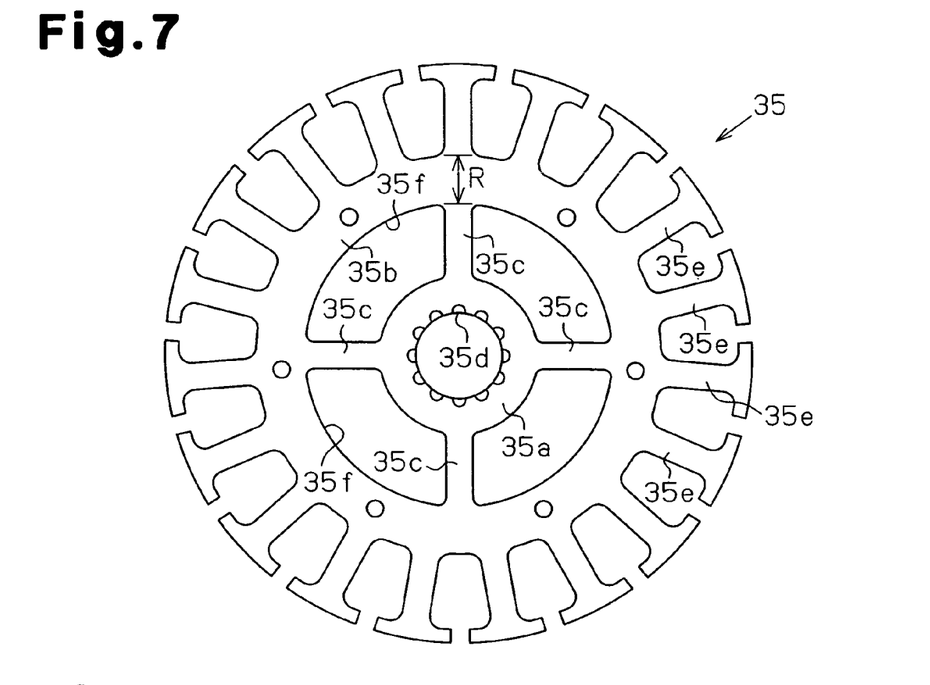
FIG. 7 is a front view showing a first core piece 35 of FIG. 4.

As shown in FIG. 7, the first core piece 35 is a plate member including a first annular portion 35a having the shape of a disk, a second annular portion 35b having a diameter greater than that of the first annular portion 35a, and four annular supports 35c extending radially outward from the outer circumferential edge of the first annular portion 35a and contacting the inner circumferential edge of the second annular portion 35b. That is, the first core piece 35 includes four cut-out portions 35f.

The output shaft 34 is inserted into and fitted to a hole 35d at the generally central part of the first annular portion 35a. This fixes the first annular portion 35a to the output shaft 34. The second annular portion 35b is arranged coaxially with the first annular portion 35a, and formed to have an annular shape with a width R in the radial direction. That is, the width in the radial direction of the second annular portion 35b coincides with the width R in the radial direction of the core basal path 32a. The teeth strips 35e projecting radially outward and forming part of the teeth 32c of the core 32 are formed at the outer circumferential edge of the second annular portion 35b.

The first annular portion 35a and the second annular portion 35b are formed integrally and connected to each other by four annular supports 35c arranged at equal intervals.

Figure 8:
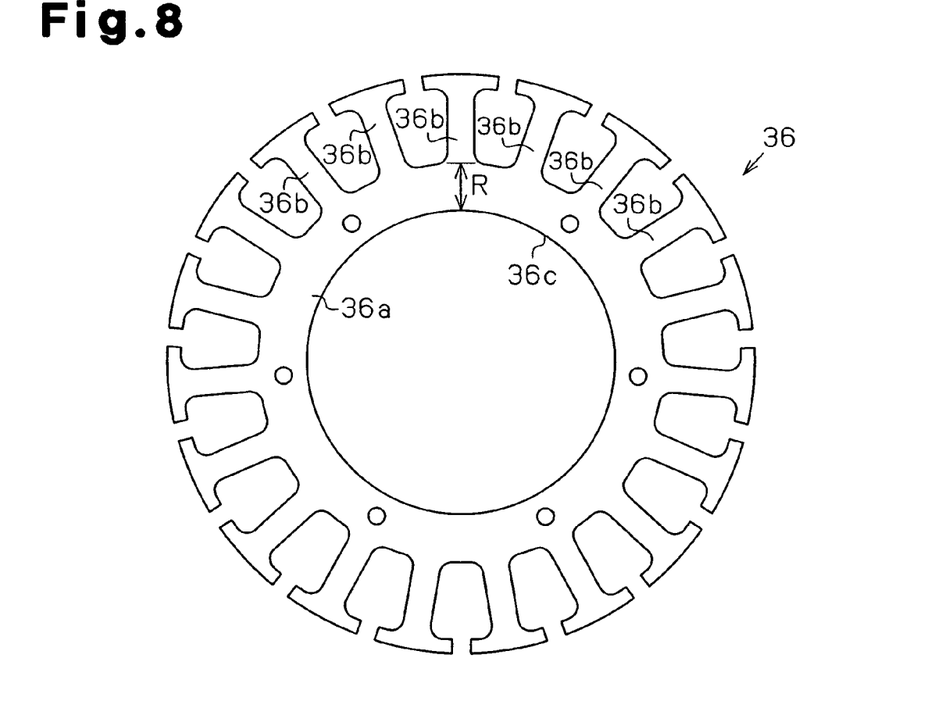
FIG. 8 is a front view showing a second core piece 36 of FIG. 4.

As shown in FIG. 8, the second core piece 36 includes a third annular portion 36a, which has the shape of a plate with a width R in the radial direction, and teeth strips 36b integrally formed at the outer circumference of the third annular portion 36a. The teeth strips 36b project radially outward and form part of the teeth 32c of the core 32. That is, the second core piece 36 is in correspondence with the member omitting the first annular portion 35a and the annular support 35c from the first core piece 35. The annular core basal path 32a is formed by stacking a plurality of second core pieces 36. Thus, an inner circumferential surface 36c of the plurality of third annular portions 36a defines the inner circumferential surface 32d of the core 32 and accommodates the second bearing 34b therein. The width in the radial direction of the core basal path 32a becomes the basal path width R of the core 32, as shown in FIG. 4.

Figure 9:
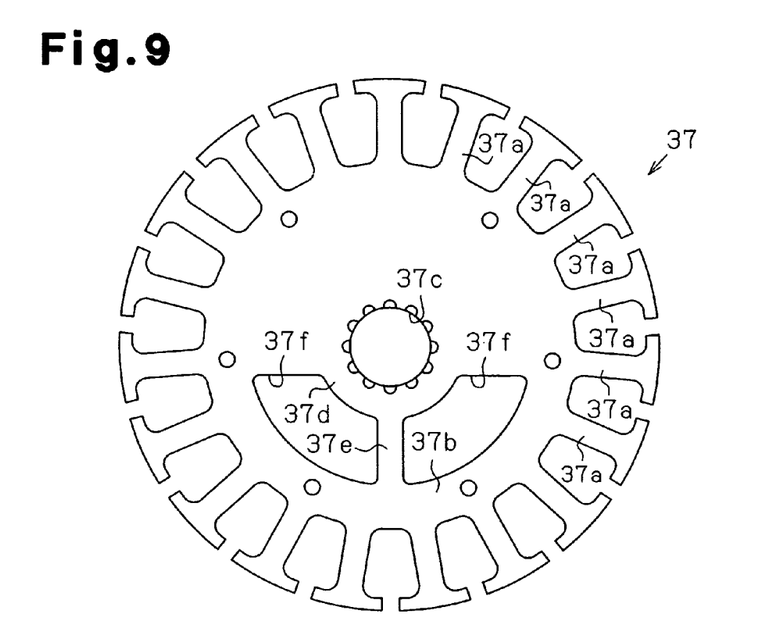
FIG. 9 is a front view showing a third core piece 37 of FIG. 4.

As shown in FIG. 9, the third core piece 37 is a plate member having the shape of a disk, and the teeth strips 37a forming part of the teeth 32c of the core 32 are formed at the outer circumferential edge of the third core piece 37. Only two cut-out portions 37f are formed in the third core piece 37 as viewed at the lower part in FIG. 9. That is, the third core piece 37 has an outer circumferential shape that is entirely identical to that of the second annular portion 35b and two filled cut-out portions 35f at the upper side of the first core piece 35. The position of the center of gravity of the third core piece 37 is shifted upward from the center. Specifically, one side, that is, the basal end of a plurality of teeth strip 37a at the lower part in the state shown in FIG. 9 with respect to the center of the third core piece 37 is connected to each other by a first arcuate portion 37b. The first arcuate portion 37b has a width in the radial direction equal to the basal path width R and is generally semi-arcuate.

Further, a second arcuate portion 37d is formed on the inner side in the radial direction of the first arcuate portion 37b. The second arcuate portion 37d has a hole 37c through which the output shaft 34 extends and a generally semi-arcuate shape. The central part in the radially inner side of the first arcuate portion 37b and the central part in the radially outer side of the second arcuate portion 37d are connected by an annular support 37e having the same dimension as the annular support 35c of the first core piece 35. As shown in FIG. 4, by stacking the plurality of third core pieces 37 on the first core piece 35, the recess 32e is formed in the end face on the output side of the core 32 at one part with respect to the entire periphery of the core 32, that is, only at the lower side of the core 32 on the inner side in the radial direction from the inner circumferential surface 32d of the core basal path 32a. The recess 32e corresponds to the cut-out portion 37f.

The pump section 2 will now be described.

As shown in FIG. 1A, the transmission chamber 41 of the pump section 2 is formed on the surface facing the motor section 1 of the pump housing 40. The transmission chamber 41 accommodates the eccentric portion 34c projecting from the motor section 1 and enables eccentric movement of the eccentric portion 34c.

A fitting portion 42 is formed at the open end of the transmission chamber 41. The fitting portion 42 is defined by forming a further recess in the transmission chamber 41 outward in the radial direction. The fitting portion 42 is formed to have a shape corresponding to the holding portion 21 projecting from the end plate 20. A radial contact surface 43 is formed between the transmission chamber 41 and the fitting portion 42. The radial contact surface 43 contacts the first bearing 34a of the motor section 1 in the radial direction. The diameter of the radial contact surface 43 is greater than that of the transmission chamber 41, and the transmission chamber 41 and the radial contact surface 43 are connected to each other by a contact surface 44 that widens generally orthogonally from the opening of the transmission chamber 41 towards the outer side in the radial direction.

As shown in FIG. 1A, the rotor 30 is biased towards the output side by the belleville spring 14 arranged in the bearing seat 12. The first bearing 34a contacts the contact surface 44 when the motor section 1 is integrally fixed to the pump section 2 with the bolt 11b, and the rotor 30 biases towards the pump housing 40 with respect to the yoke housing 10 due to the belleville spring 14. This pushes the rotor 30 back to the anti-output side with respect to the yoke housing 10. That is, the commutator 33 moves away from the holding portion 21 of the end plate 20 by fixing the motor section 1 to the pump section 2. Thus, the belleville spring 14 prevents the first bearing 34a and the second bearing 34b from becoming loose, and the end plate 20 does not interfere with the rotation of the rotor 30.

Further, a plunger accommodation portion 45 is formed in the pump housing 40 so as to extend radially outward from the transmission chamber 41 of the output shaft 34. The plunger 46, which is accommodated in the plunger accommodation portion 45, moves in the radial direction of the eccentric portion 34c, contacts the outer circumferential surface of the third bearing 34e, and reciprocates while slidably moving in the plunger accommodation portion 45 as the rotor 30 rotates. As the plunger 46 reciprocates and slides, hydraulic oil, which serves as fluid in the hydraulic chamber 47 and communicates with the plunger accommodation portion 45, is pressurized and sent outside of the pump section 2.

The first embodiment has the advantages described below.

(1) The second bearing 34b and the commutator 33 overlap the winding 31 in the axial direction of the output shaft 34. Specifically, the second bearing 34b and the maximum outer diameter portion (hook 33b) of the commutator 33 are arranged between the two ends 31a of the winding 31 in the axial direction of the output shaft 34. The output shaft 34 is shortened by the overlapping amount of the winding 31 and the second bearing 34b and the overlapping amount of the winding 31 and the commutator 33.

However, the second bearing 34b and the commutator 33 are accommodated at the radially inward side of the winding 31. This reduces the cross-section of the core 32 and increases the possibility of magnetic saturation. As shown in FIG. 1B, the annular portion of the core 32, or the core basal path 32a, connecting the basal ends of the plurality of teeth 32c around which the winding 31 is wound, is where the line of magnetic force concentrates most and has a tendency of magnetic saturation occurring. The width in the radial direction of the core basal path 32a is referred to as the basal path width R.

The torque produced by the motor section 1 is proportional to the amount of magnetic flux that enters the core 32 from the plurality of magnets 13, which are field magnetic poles, that is, the torque is proportional to the total amount of magnetic flux generated by the field magnetic pole. The amount of magnetic flux generated by a single magnetic flux is reduced to ½, ⅓, and so on even if the number of magnetic poles (number of magnets 13) of the same capacity is increased from two poles, four poles, six poles, and so on under the condition that the torque is constant.

A magnetic circuit in which the magnetic flux generated by the N magnetic pole flows through the teeth 32c facing the N magnetic pole, the core basal path 32a connected to the teeth 32c, the teeth 32c adjacent to the teeth 32c, and the S magnetic pole adjacent to the N magnetic pole will now be discussed. Since the amount of magnetic flux generated from a single magnetic pole (magnet 13) decreases when the number of magnetic poles increases, the amount of magnetic flux that flows to the portion of the core basal path 32a per unit length in the circumferential direction also decreases. This is shown in the graph of FIG. 10.

Figure 10:
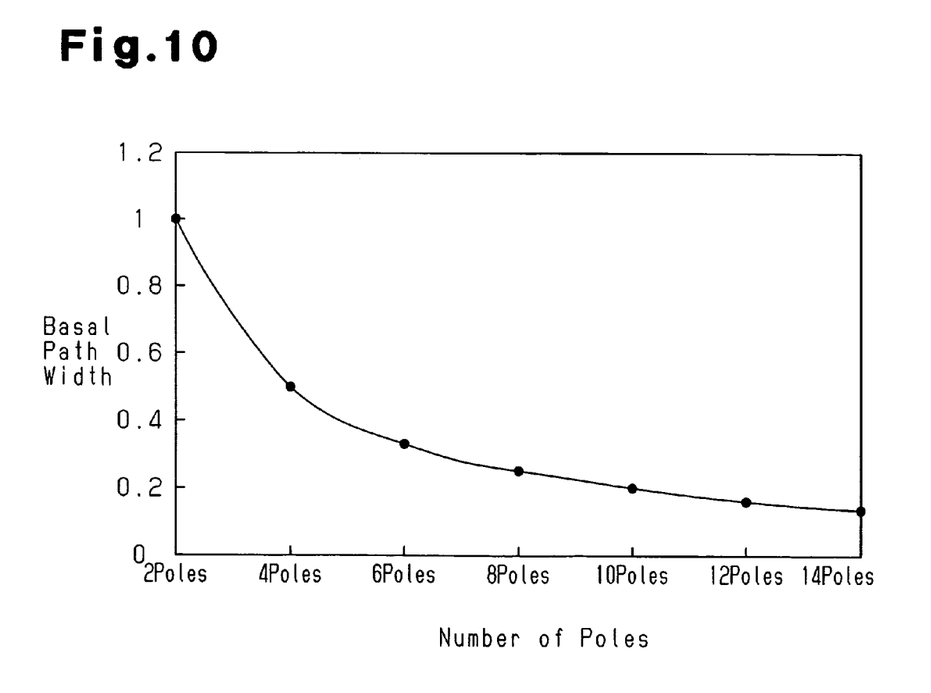
FIG. 10 is a graph showing the relationship between a basal path width R of the core and the number of magnetic poles.

FIG. 10 is a graph showing the relationship between the number of magnetic poles with the horizontal axis and the basal path width R with the vertical axis of when the magnetic flux density is the same in cases in which the number of magnetic poles is two and fourteen. The basal path width R has a value of one when the number of magnetic poles is two. As shown in FIG. 10, the basal path width R decreases to ½, ⅓, . . . as the number of magnetic poles increases to four poles, six poles, . . . . However, the basal path width R does not significantly change for six or more poles, that is, the rate of change of the basal path width R is extremely small. For six or more poles, the number of components (number of magnetic poles) may increase. However, this does not contribute to reducing the diameter of the core 32. Thus, the most balanced and preferred number of magnetic poles for facilitating manufacturing with a small number of components while reducing the dimension in the radial direction of the core 32 small is six.

That is, in the first embodiment, the basal path width R is effectively narrowed in the most balanced manner and the diameter of the core 32 is reduced by arranging magnets 13 for six poles. Further, the output shaft 34 is shortened since the second bearing 34b and part of the commutator 33 are accommodated between the two ends 31a of the winding 31 in the rotation axis CL. The motor section 1 is miniaturized in the radial direction and the axial direction of the core 32. The commutator 33 includes an electrical contact point on the outer circumferential surface, and the brush 22 is biased towards the inner side in the radial direction of the rotor 30. That is, the brush holder 23 and the spring 23a forming the mechanism for biasing the brush 22 towards the commutator 33 are arranged adjacent to the rotor 30 in the radial direction. This miniaturized the motor section 1 in the axial direction of the output shaft 34, or the axial direction of the rotor 30.

(2) The second bearing 34b is arranged at the radially inner side of the inner circumferential surface 32d of the core basal path 32a. The second bearing 34b and the core 32 thus overlap in the axial direction of the output shaft 34. The axis of the output shaft 34 is shortened by the overlapping amount of the second bearing 34b and the core 32. This ensures miniaturization of the motor section 1.

(3) The center of gravity BP of the balance 32b and the center of gravity EP of the eccentric portion 34c are each arranged on one side of the rotation axis CL of the output shaft 34. The deviation of the position of the center of gravity EP of the eccentric portion 34c from the rotation axis CL of the rotor 30 is thus canceled by the deviation of the position of the center of gravity BP of the balance 32b. Since the center of gravity of the rotor 30 is brought closer to the rotation axis CL of the rotor 30, vibration and noise during motor drive caused by eccentricity of the rotor 30 are suppressed.

(4) The balance 32b includes a recess 32e formed at the radially inner side of the core basal path 32a. The balance 32b is formed by forming the recess 32e without affecting the magnetic path in the vicinity of the teeth 32c. This reduces the possibility of magnetic saturation at the core 32. Since the balance 32b is defined by forming the recess 32e in part of the core 32, a new member for forming the balance 32b is unnecessary. This contributes to the miniaturization of the motor section 1.

(5) The first bearing 34a is exposed from the motor section 1. Therefore, the first bearing 34a and the end plate 20 overlap in the axial direction of the output shaft 34. Thus, the output shaft 34 is shortened by the overlapping amount. This further miniaturizes the motor section 1.

Further, the dimension of the through hole 21a of the holding portion 21 is smaller than the dimension of the first bearing 34a in the axial direction of the output shaft 34, and the first bearing 34a is exposed from the motor section 1. This ensures that the first bearing 34a is supported with a high fitting accuracy by holding the first bearing 34a in the pump housing 40, which functions as an attached portion two which the motor section 1 is fixed. That is, the first bearing 34a is supported by the pump housing 40 with a high fitting accuracy by having the portion exposed from the end plate 20 of the first bearing 34a contact the radial contact surface 43. This ensures that the output shaft 34, or the rotor 30, is supported by the pump housing 40. Consequently, the pump load that acts on the motor section 1 is suppressed, and the driving state of the motor section 1 is maintained in an optimal state.

(6) As shown in FIG. 2, the outer diameter of the commutator 33 is greater than that of the through hole 21a in a state before attaching the motor section 1 to the pump housing 40. Thus, the end face of the commutator 33 contacts the holding portion 21. That is, the end face of the commutator 33 having an outer diameter greater than that of the through hole 21a contacts the end plate 20 since the rotor 30 is biased towards the output side. In the state shown in FIG. 2, the orientation of the output shaft 34 is thus maintained without fixing the first bearing 34a to the end plate 20. As a result, highly accurate machining becomes unnecessary for the formation of the through hole 21a. Further, assembly of the motor section 1 to the pump section 2 is facilitated. As shown in FIG. 1, the rotor 30 is pushed back to the anti-output side against the biasing force of the belleville spring 14, and the commutator 33 moves away from the end plate 20 when the motor section 1 is fixed to the pump section 2. The rotation of the output shaft 34 is not interfered with since the commutator 33 and the end plate 20 are spaced apart from each other when the motor section 1 drives the pump section 2.

(7) The bearing seat 12 has a two layer cylindrical structure. The rigidity of the bearing seat 12 with respect to the pump load that acts in the radial direction on the rotor 30 is enhanced. This optimally maintains the drive of the motor section 1.

The present embodiment of the present invention may be modified as described below.

In the above embodiment, the second bearing 34b and the maximum outer diameter portion (hook 33b) of the commutator 33 are both arranged so as to fit between the ends 31a of the core 32 in the axial direction of the output shaft 34. That is, the second bearing 34b and the commutator 33 both overlap with the core 32 in the axial direction of the output shaft 34. However, the present invention is not limited in this manner, and only one of either the second bearing 34b or the commutator 33 may overlap with the core 32 in the axial direction of the output shaft 34. For instance, only one of either the second bearing 34b or the maximum outer diameter portion (hook 33b) of the commutator 33 may be arranged between the ends 31a of the core 32. The maximum outer diameter portion (hook 33b) of the commutator 33 does not have to be arranged so as to fit between the ends 31a of the core 32, and parts other than the maximum outer diameter portion of the commutator 33 may be arranged so as to fit between the ends 31a of the core 32.

The second bearing 34b is accommodated in the radially inner side of the inner circumferential surface 32d of the core basal path 32a in the above embodiment. However, the advantages described above are also obtained by arranging the hook 33b or the maximum outer diameter portion of the commutator 33 at the radially inner side of the core basal path 32a.

The first to the third core pieces 35 to 37 are each stacked in pluralities to suppress eddy current in the above embodiment. However, the present invention is not limited in such a manner, and the core 32 may be formed by a single core piece.

In the above embodiment, the basal path width R of the core 32 may be narrowed within a range in which magnetic saturation does not occur.

A second embodiment of the present invention will now be described with reference to FIGS. 11 to 13.

The present embodiment and the first embodiment have a different number of magnets.

Figure 11:
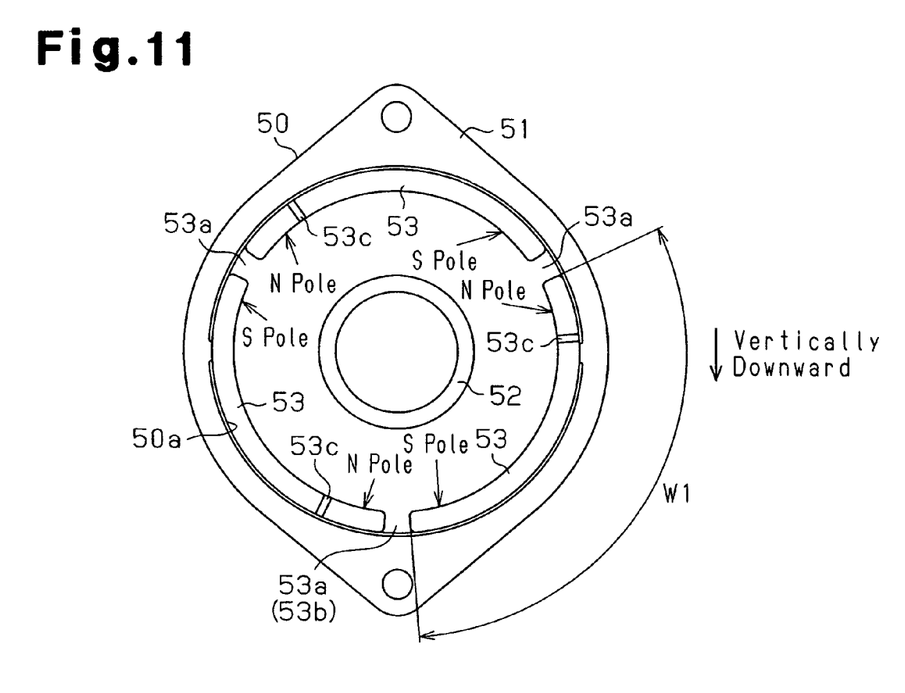
FIG. 11 is a plan view showing a yoke housing and three magnets of a pump motor according to a second embodiment of the present invention.

In FIG. 11, the arrow indicates the vertically downward direction.

Figure 12:
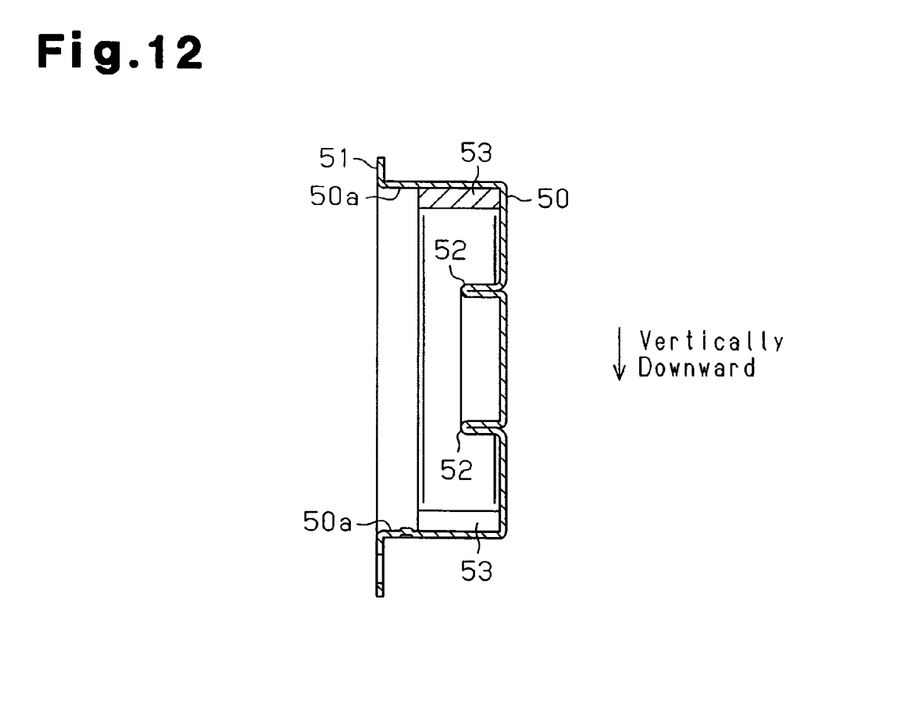
FIG. 12 is a cross-sectional view of the yoke housing of FIG. 11.

As shown in FIGS. 11 and 12, the yoke housing 50 of the second embodiment includes a flange 51, which extends radially outward from the end at the side of the opening, and a bearing seat 52 for accommodating one end of the rotor 30. As shown in FIG. 11, three segment magnets 53 are arranged on the inner circumferential surface 50a of the yoke housing 50 so as to face the rotor 30. A gap 53a is formed between adjacent segment magnets 53. The segment magnets 53 are arranged at equal intervals in the circumferential direction with the gap 53a in between. The segment magnet 53 is arranged at the inner circumferential surface 50a so that every third gap 53a (gap 53b) is arranged vertically downward.

Figure 13:
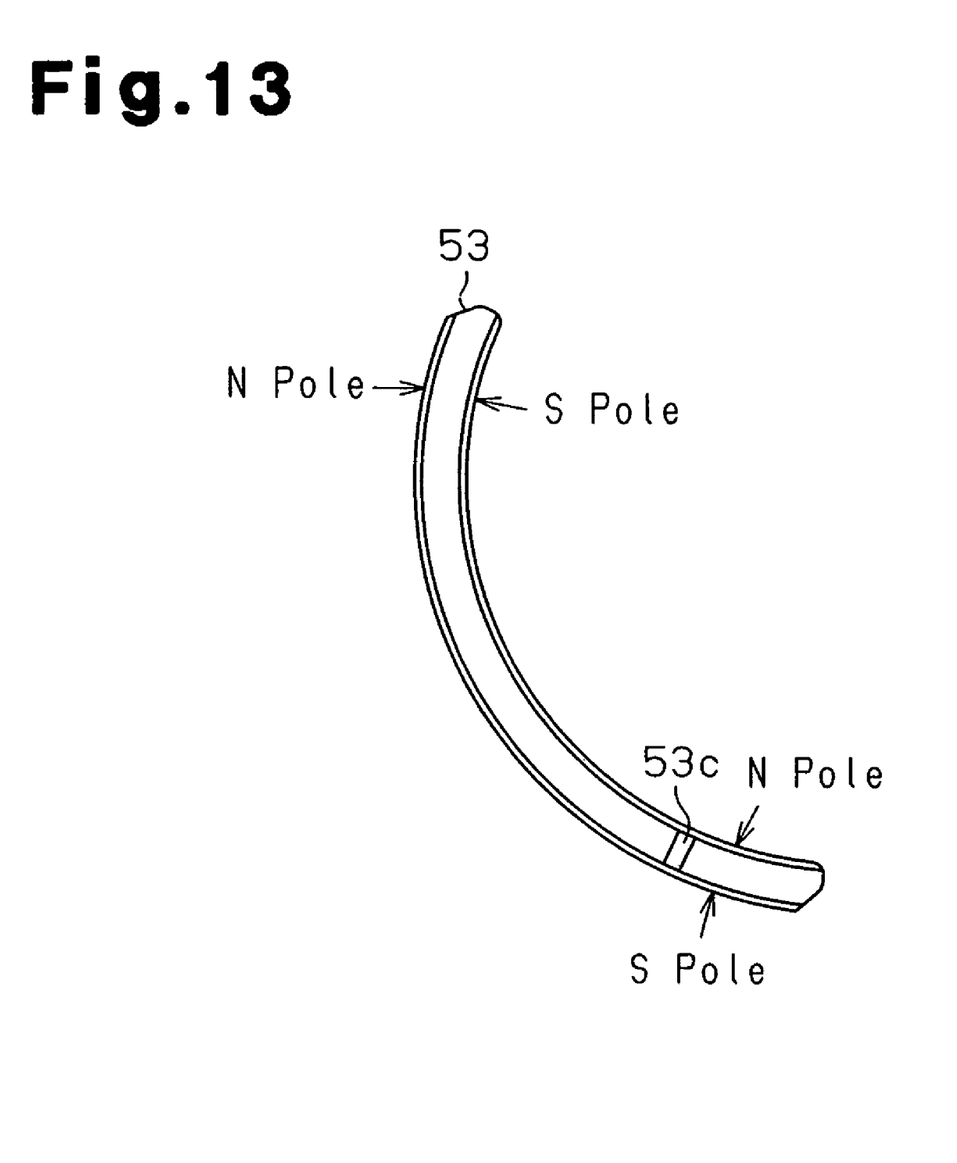
FIG. 13 is a front view showing part of the magnet of FIG. 11.

FIG. 13 shows an enlarged view of the segment magnet 53. As shown in FIG. 13, the segment magnet 53 is polarized so as to have an N pole on one end and an S pole on the other end in the circumferential direction. That is, one segment magnet 53 forms two poles of the six magnetic poles in the motor section 1. That is, a magnetic field body having six magnetic poles is configured by three segment magnets 53. Mark 53c is formed on each segment magnet 53 at a position corresponding to the N pole. The mark 53c determines the position and the direction of the segment magnet 53 with respect to the yoke housing 50.

When the number of poles is six, the open angle for two adjacent magnetic poles, that is, the rotation angle of the rotor 30 for changing the magnetic flux for one cycle is 120° at maximum. The open angle of when the number of magnetic poles is six is large compared to the field magnet having a number of poles greater than six. Thus, when the number of magnetic poles is six, the N pole and the S pole are more easily and continuously polarized in the circumferential direction compared to when there are more magnetic poles. The segment magnet 53 having two adjacent magnetic poles, that is, a set of N pole and S pole, is easily obtained when there are six magnetic poles.

In other words, in the second embodiment having three segment magnets 53, the circumferential dimension W1 becomes larger than when forming the magnetic field body with more than six magnetic poles. This facilitates the polarization of the N pole for one segment magnet 53 at one end in the circumferential direction and the polarization of the S pole at the other end. That is, the segment magnet 53 for the field magnet of six poles is easily obtained compared to the field magnet having a greater number of poles. Since six poles are formed by a total of three segment magnets 53, the circumferential dimension W1 of one magnet becomes larger than that when forming the field body with more than six poles. Thus, a strong magnetic field is distributed on one segment magnet 53. This provides a segment magnet 53 having a high magnetic capacity and contributes to increasing the output.

The two magnetic poles (N pole and S pole) are formed by one segment magnet 53. Thus, a magnetic field body of six poles is formed by three segment magnets 53. This reduces the number of components and the number of manufacturing steps compared to a magnetic field body formed by six magnets.

The second embodiment has the advantages described below.

(8) There are six field magnetic poles. This enlarges the circumferential dimension W1 of the segment magnet 53 and a strong magnetic field is generated at one segment magnet 53. This provides a segment magnet 53 having a high magnetic capacity and contributes to increasing the output of the motor section 1.

(9) The magnetic field body, which has six field magnetic poles, is formed by three segment magnets 53. Thus, the number of components is reduced compared to a magnetic field body having six magnets. Further, the number of manufacturing steps of the motor section 1 is reduced.

(10) Fluid, such as hydraulic oil and lubricating oil, flowing into the motor section 1, or the yoke housing 50, enters the gap 53b located at the vertically downward side. As a result, the liquid in the yoke housing 50 is eliminated from the surface facing toward the rotor 30 of the segment magnet 53. Since the liquid moves away from the rotor 30, the possibility of the liquid contacting the rotor 30 and being dispersed is reduced.

It should be apparent to those skilled in the art that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope and equivalence of the appended claims.

What is claimed is:

1. A motor for use with a pump, wherein the motor includes an output shaft, and the pump includes a pump plunger reciprocated in a radial direction of the output shaft by rotation of the output shaft, the motor comprising:
    a core fixed to the output shaft so as to be integrally rotatable with the output shaft, the core including an annular portion and a plurality of teeth extending radially outward from the annular portion;
    a plurality of windings wound around the plurality of teeth;
    a commutator fixed to the output shaft so as to be integrally rotatable with the output shaft, the commutator being formed to be generally cylindrical, and the commutator having a circumferential surface having an electrical contact point;
    a first bearing and a second bearing for rotatably supporting the output shaft, the core and the commutator being arranged between the first bearing and the second bearing in an axial direction of the output shaft, the second bearing overlapping the windings in the axial direction of the output shaft; a magnetic field body having six magnetic poles; and a case for accommodating the output shaft, the case including a through hole for insertion of the first bearing, the through hole having a dimension that is smaller than that of the first bearing in the axial direction of the output shaft, and part of the first bearing being exposed to the outside of the case.

2. The motor according to claim 1, wherein the commutator includes a maximum outer diameter portion, the maximum outer diameter portion overlapping with the winding in the axial direction of the output shaft.

3. The motor according to claim 1, wherein the second bearing is arranged in the radially inner side of the annular portion.

4. The motor according to claim 1, wherein:
    the output shaft includes an eccentric portion having a center of gravity located at a position separated from the axis of the output shaft, the eccentric portion displacing the pump plunger in the radial direction of the output shaft as the output shaft rotates;
    the core including a balance having a center of gravity located at a position separated from the axis of the output shaft; and
    the axis of the output shaft located between the center of gravity of the balance and the center of gravity of the eccentric portion.

5. The motor according to claim 4, wherein the balance includes a recess formed at the radially inner side of the annular portion.

6. The motor according to claim 1, wherein:
    the output shaft is biased in a direction towards the first bearing from the second bearing; and from the second bearing; and
    the commutator is arranged adjacent to the first bearing, the commutator having an outer diameter greater than the outer diameter of the first bearing and greater than the diameter of the through hole.

7. The motor according to claim 6, wherein:
    the case includes a yoke housing, formed to be cylindrical with a bottom wall on one end and an opening on the other end, and an end plate for closing the opening of the yoke housing, the end plate including a generally central portion with the through hole;
    the bottom wall of the yoke housing includes a bearing seat for supporting the output shaft; and
    the bearing seat has a two layer structure, the two layer structure being formed by bending the bottom wall of the yoke housing towards the opening.

8. The motor according to claim 1, wherein the field body includes three segment magnets, each segment magnet having an N pole and an S pole aligned in the circumferential direction of the motor.

9. The motor according to claim 8, wherein: the three segment magnets are arranged so that a gap is formed between the segment magnets that are adjacent to each other; and one of the gaps is arranged on a vertically lower portion of the motor.

10. A motor for use with a pump, wherein the motor includes an output shaft, and the pump includes a pump plunger reciprocated in a radial direction of the output shaft by rotation of the output shaft, the motor comprising:
    a core fixed to the output shaft so as to be integrally rotatable with the output shaft, the core including an annular portion and a plurality of teeth extending radially outward from the annular portion;
    a plurality of windings wound around the plurality of teeth;
    a commutator fixed to the output shaft so as to be integrally rotatable with the output shaft, the commutator being formed to be generally cylindrical, and the commutator having a circumferential surface having an electrical contact point;
    a bearing for rotatably supporting the output shaft, at least one of the bearing and the commutator overlapping the windings in an axial direction of the output shaft; and a magnetic field body having six magnetic poles, wherein the annular portion has a constant radial width, the radial width being set to a dimension at which the annular portion magnetically saturates due to the magnetism generated by the magnetic field body.

11. The motor according to claim 10, wherein at least one of the bearing and the commutator is arranged at the radially inner side of the annular portion.

12. A motor including an output shaft for driving a driven device, the driven device including a housing member, the motor comprising:

- a core fixed to the output shaft so as to be integrally rotatable with the output shaft, the core including an annular portion and a plurality of teeth extending radially outward from the annular portion;
- a plurality of windings wound around the plurality of teeth;
- a commutator fixed to the output shaft so as to be integrally rotatable with the output shaft, the commutator being generally cylindrical, and the commutator having a circumferential surface with an electrical contact point;
- a first bearing and a second bearing for rotatably supporting the output shaft, the first bearing and the second bearing having the core and the commutator arranged therebetween in the axial direction of the output shaft, at least one of the second bearing and the commutator overlapping the windings in the axial direction of the output shaft;
- a magnetic field body having six magnetic poles;
- a case for accommodating the output shaft, the case including a through hole for insertion of the first bearing, the through hole having a dimension smaller than the dimension of the first bearing in the axial direction of the output shaft; and
- a biasing portion for biasing the output shaft so that part of the first bearing extends through the through hole and out of the case, the part of the first bearing extending out of the case being pushed against the pump housing and being fitted to and held by the pump housing when the case is attached to the driven device.

13. A motor for use with a pump, wherein the motor includes an output shaft, and the pump includes a pump plunger reciprocated in a radial direction of the output shaft by rotation of the output shaft, the motor comprising:

- a core fixed to the output shaft so as to be integrally rotatable with the output shaft, the core including an annular portion and a plurality of teeth extending radially outward from the annular portion;
- a plurality of windings wound around the plurality of teeth;
- a commutator fixed to the output shaft so as to be integrally rotatable with the output shaft, the commutator being formed to be generally cylindrical, and the commutator having a circumferential surface having an electrical contact point;
- a first bearing and a second bearing for rotatably supporting the output shaft, the core and the commutator being arranged between the first bearing and the second bearing in an axial direction of the output shaft; and
- a case for accommodating the output shaft, the case including a through hole for insertion of the first bearing, the through hole having a dimension that is smaller than that of the first bearing in the axial direction of the output shaft, and part of the first bearing being exposed to the outside of the case.

14. The motor according to claim 13, wherein:
the output shaft is biased in a direction towards the first bearing from the second bearing; and
the commutator is arranged adjacent to the first bearing, the commutator having an outer diameter greater than the outer diameter of the first bearing and greater than the diameter of the through hole.

15. The motor according to claim 14, wherein:
the case includes a yoke housing, formed to be cylindrical with a bottom wall on one end and an opening on the other end, and an end plate for closing the opening of the yoke housing, the end plate including a generally central portion with the through hole;
the bottom wall of the yoke housing includes a bearing seat for supporting the output shaft; and
the bearing seat has a two layer structure, the two layer structure being formed by bending the bottom wall of the yoke housing towards the opening.

16. A motor for use with a pump, wherein the motor includes an output shaft, and the pump includes a pump plunger reciprocated in a radial direction of the output shaft by rotation of the output shaft, the motor comprising:

- a core fixed to the output shaft so as to be integrally rotatable with the output shaft, the core including an annular portion and a plurality of teeth extending radially outward from the annular portion;
- a plurality of windings wound around the plurality of teeth;
- a commutator fixed to the output shaft so as to be integrally rotatable with the output shaft, the commutator being formed to be generally cylindrical, and the commutator having a circumferential surface having an electrical contact point;
- a bearing for rotatably supporting the output shaft; and
- a magnetic field,
- wherein the annular portion has a constant radial width, the radial width being set to dimension at which the annular portion magnetically saturates due to the magnetism generated by the magnetic field body.

* * * * *